United States Patent [19]

Strong

[11] Patent Number: 4,840,459

[45] Date of Patent: Jun. 20, 1989

[54] MATRIX ADDRESSED FLAT PANEL LIQUID CRYSTAL DISPLAY DEVICE WITH DUAL ENDED AUXILIARY REPAIR LINES FOR ADDRESS LINE REPAIR

[75] Inventor: Michael F. Strong, Patersonville, N.Y.

[73] Assignee: General Electric Co., Schenectady, N.Y.

[21] Appl. No.: 116,199

[22] Filed: Nov. 3, 1987

[51] Int. Cl.[4] ........................... G02F 1/13; G09G 3/36
[52] U.S. Cl. ..................................... 350/333; 350/336; 350/334; 437/923; 340/784
[58] Field of Search ................ 340/719, 784; 350/333, 350/334, 336; 437/82, 923; 365/63, 149

[56] References Cited

U.S. PATENT DOCUMENTS 4,368,523 1/1983 Kawate ............................... 350/334
4,688,896 8/1987 Castleberry ......................... 350/333

*Primary Examiner*—Stanley D. Miller
*Assistant Examiner*—Huy Kim Mai
*Attorney, Agent, or Firm*—I. D. Blumenfeld

[57] ABSTRACT

A liquid crystal display which incorporates auxiliary repair lines which cross over the main address lines of the display. The repair lines can be electrically shorted to address lines at their crossover points to repair open circuited address lines. The repair may be driven from drive pads on either end to supply signals to otherwise open-circuited address lines. After a repair line has been short circuited to an address line, the remaining portion of the repair line is cut off to form a second repair line drivable from the driver pad connected to their portion of the line.

7 Claims, 2 Drawing Sheets

MATRIX ADDRESSED FLAT PANEL LIQUID CRYSTAL DISPLAY DEVICE WITH DUAL ENDED AUXILIARY REPAIR LINES FOR ADDRESS LINE REPAIR

BACKGROUND OF THE INVENTION

This invention relates to a Liquid Crystal Display of the X-Y matrix type containing auxiliary repair lines which can be selectively shorted to an open circuited main address line. More particularly, it relates to auxiliary repair lines which may be driven from either end thus doubling the number of address line repairs that can be effectuated for any given amount of repair lines.

U.S. Pat. No. 4,688,896 issued Aug. 25, 1987, assigned to the General Electric Company the assignee of the present invention, describes a Liquid Crystal Display device of the X-Y matrix type with line repair capability by means of auxiliary address lines which may be selectively shorted to any main address line having an open circuit so that the open circuited address line may then be driven from the auxiliary repair line. Thus, improvements in manufacturing yield for Liquid Crystal Displays having very high address line desities (i.e., densities in the order of 100 or more per inch) may be realized because any open circuit main address line failure occurring during manufacture may be readily repaired by electrically shorting an open circuited address line to the auxiliary line. The open circuited address line is then driven from the auxiliary line.

Separate auxiliary address repair lines cross all of the main X address lines and all of the main Y address lines so that any open circuited main address line in the matrix may be repaired by electrically shorting an auxiliary repair line to that address line. Since an open circuited address line will, depending on its location, de-energize all of the pixels beyond the open circuit the ability to repair the address lines is highly advantageous in a high density display. Thus, in a 4"×4" display with a hundred line per in. density there are at least 400 X address lines and 400 Y address lines, and loss of a single address line can result in deenergizing anywhere from 1-400 pixels. The invention described in the above identified patent is extremely useful in permitting repair of any address lines found to contain an open circuit thus enhancing the overall manufacturing yield. The ratio of auxiliary address repair lines to address lines can be kept quite low (1:10 or less). For example, for a 4×4 inch matrix addressed display having 400 X and 400 Y address lines, 32 address repair lines( 16 ; on either side of the active matrix area) for each of the maix X and Y address line groups has been found adequate.

In the system shown in U.S. Pat. No. 4,688,896, the auxiliary repair lines are single ended in that they contain a single drive pad at one end of the repair line for receiving the driver signals to energize the main address line whenever a repair is effected. Thus, when a when the repair line is shorted to a main address line, the portion of the repair line beyond the point of repair is not usable and is, in effect, wasted. It would be desirable and very useful to reduce the total number of auxiliary repair lines without diminishing the repair capacity. Reducing the number of line permits wider spacing of the lines thereby minimizing the possibility of shorts between the repair lines. Furthermore, it permits the use of wider repair lines with the attendant reduction in the resistance of the repair lines; and it minimizes the non active area and hence the overall size of the Liquid Crystal Display.

SUMMARY OF THE INVENTION

Applicant has found that all of these desirable results may be achieved by providing dual ended auxiliary repair lines so that the auxiliary address repair lines can be driven from both ends. That is, connector or driver pads are attached to both ends of each repair line. When a main address line is repaired by electrically shorting the repair line to the address line, it is driven from one of the two driver pads connected to opposite ends of the repair line. The repair line is then severed immediately beyond the point where it has been electrically shorted to the address line thereby leaving the remaining portion of the repair line and the driver pad at the other end available for repair of address lines beyond the severance point. Each auxiliary repair line is thus capable of being converted into two auxiliary repair lines thereby reducing the total number of repair lines while still maintaining the same repair capability. Thus, in the example previously given the 16 single ended repair lines on either side of the main X and Y address lines are reduced to 8 dual ended repair lines capable of being driven from both ends. When one address repair line is shorted to a main address line, that repair line is cut off beyond the point to provide a second repair line. When the second repair line is used to repair a subsequent main address line, the connector pad connected to the other end of the second repair line drives the second repair line.

It is therefore a principal objective of the instant invention to provide a Liquid Crystal Display with repair capability for address lines in which each repair line end can be s separately driven.

Yet another objective of the invention is to provide a Liquid Crystal Display with repair line capability in which the number of repair lines may be reduced without reducing the repair capability.

Still another objective of the invention is the Liquid Crystal device with enhanced manufacturing yield by providing severable repair lines capable of being driven from either end.

Yet other objectives and advantages of the instant invention will be realized as the description thereof proceeds.

While the specification includes the claims defining the features of the invention regarded as being novel, it is believed that the invention, together with further objectives thereof, will best be understood with the following description in conjunction with the drawings in which:

DETAILED DESCRIPTION OF THE PREFERRED EMBODIMENTS

Figure 1:
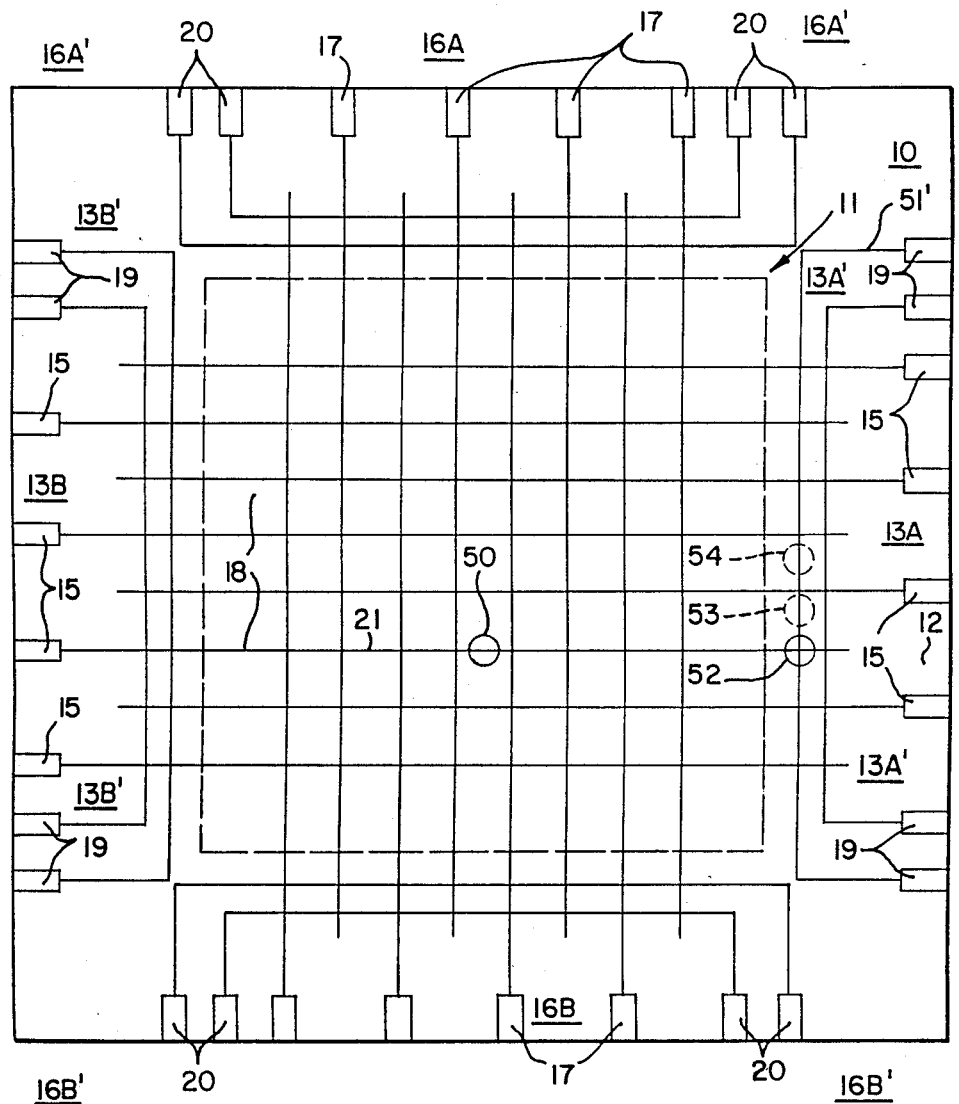
FIG. 1 is a simplified, top plan view of an address line arrangement for a Liquid Crystal Display in accordance with the invention.

FIG. 1 depicts, in simplified form, a Liquid Crystal Display system in which electrical input signals from an information conversion device (not shown), are converted into optical information. The Liquid Crystal Display 10 has active liquid display area 11 shown within the dashed outline and an inactive border area 12 containing the input lines and connector pads for the input signals.

The active area of the Liquid Crystal Display shows an arrangement of one group of main X address lines 13A on one side of the cell and another group of main X address lines 13B on the other side, with groups 13A and 13B being interdigitated. Address lines 13A and 13B extend to the edge of the Liquid Crystal Display and terminate in connector pads 15 to which the drive signals for address lines 13A and 13B are applied. Similarly, the active cell area 11 includes main Y address lines 16A and 16B shown extending from the top and bottom which are also interdigitated and connected to driver pads 17 that supply electrical drive signals to the main Y address lines. The individual X and Y main address lines are connected to individual Liquid Crystal Cells or pixels 18.

Cells 18 are shown as squares in the simplified view of FIG. 1. A more detailed view of such Liquid Crystal Cells appears in FIG. 2. In the schematic view of FIG. 2, it can be seen that main X address lines 13A, 13B are electrically isolated from main Y address line 16A and 16B. A Liquid Crystal element 100 is shown as electrically connected between a switching element 101 and a reference or ground potential 102. The Liquid Crystal element is represented as a capacitor in accordance with the primary electrical characteristics of Liquid Crystal elements. As is well known in the art, a Liquid Crystal element constitutes a passive transmitter of light generated from an independent light source. The Liguid Crystal Elements are selectively activated by the electrical signal on address lines X and Y to control the light transmitting characteristics of the individual cells.

Figure 2:
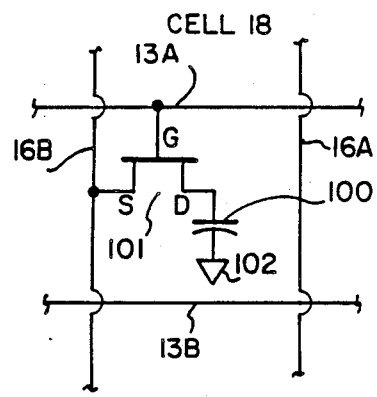
FIG. 2 is a detail view of a portion of the address line arrangement of FIG. 1 which illustrates detailed aspects of the individual line and cell components of the display.

Switching device 101 of FIG. 2 is shown as a field effect transistor (FET) with the FET preferably being of the amorphous silicon type. Each FET contains a gate electrode G connected to a Y address line 13A, or 13B a source electrode S connected to a Y address line 16B or 16A and a drain electrode D connected to a Liquid Crystal element 100. Thus, the Liquid Crystal element 100 is electrically connected via the FET switch 101 to Y address lines 16B whenever gate G of FET 101 is provided with an appropriate electrical gating signal via main X line 13A to render FET 101 conductive between its source and drain electrodes.

Referring once more to FIG. 1, in addition to the main X address lines and main Y address line 16A and 16B, the system also includes dual ended auxiliary X address repair lines 13A', and 13B' and dual ended auxiliary Y address lines 16A' and 16B'. The auxiliary repair lines cross over the main X and Y address lines. That is, the auxiliary repair lines cross over but are insulated from the main address lines at the crossover points. However, as pointed out previously and as will be discussed in detail below,( in connection with FIGS. 3A and 3B), the auxiliary repair lines can be shorted to and thereby repair an open circuited main address line. In the example shown in FIG. 1 an X repair line consists of a conductive line element 51 having connector pads 19 at opposite ends thereof. Similarly, the Y repair lines 16A' and 16B' cross the main Y address lines and have connector pads 20 at opposite ends thereof.

The auxiliary address repair lines of the present invention may be utilized in the following manner to provide an electrical connection to an open circuited main address line. Thus, for example, if as illustrated in FIG. 1 main address line 21, which is driven from driver pad 15 on the left is open circuited at a location shown by the circle 50, all Liquid Crystal elements 18 to the right of location 50 are isolated from the input signals. Main X address line 21 is repaired by electrically shorting one of auxiliary repair lines 51 to main address line 21 crossover point 52. Drive signals for the pixels to the right of open circuit are applied via pad 19 associated with repair line 51.

When auxiliary repair line 51 is electrically shorted to main address line 20 at intersection point 52, for example, repair line 51 is then severed at a point (as exemplified by the dashed circles 53 or 54) beyond intersection 52. Repair line 51 is thus divided to provide a further address repair line which then may be driven from the connector pad 19 associated with repair line portion extending beyond intersection 52.

Thus, each auxiliary repair line for the main X and Y address lines may be divided into two separate repair lines which can be driven from opposite ends.

In this manner the number of auxiliary repair lines in the inactive area 12 is halved while esentially providing the same number of repair lines. Although the manner in which the repair lines driven from both ends has been described in connection with repair of a main X address line, it will be obvious, that the same arrangement is effective with respect to the main Y address lines and it is associated with Y auxiliary repair lines.

Figures 3A, 3B:
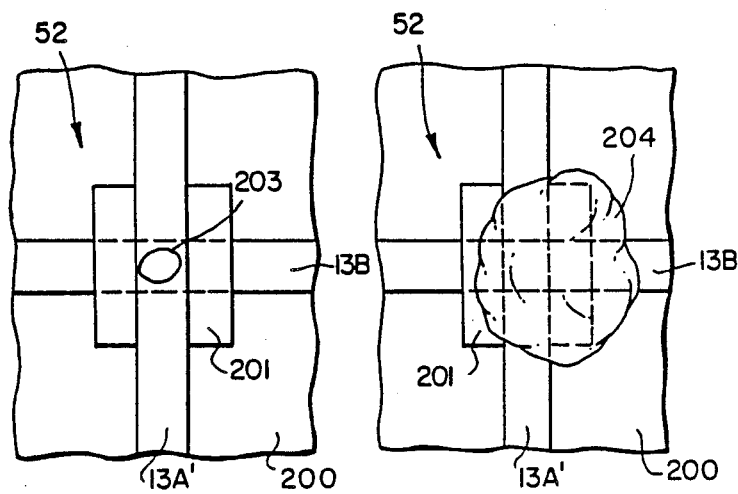
FIG. 3a and 3b are schematic views of a crossover point between the auxiliary repair line and the main address line and illustrates the technique for electrically shorting the repair line to the address line.

The preferred technique for electrically shorting an auxiliary address repair line to a main address line is illustrated in FIG. 3A and 3B which represents a portion of the address line arrangement of FIG. 1. The top plan view of FIG. 3A shows a main Xaddress line 13B and auxiliary repair X address line 13A' with the repair line crossing over the main line at locaiton 52. A substrate 200 supports the main and the repair address lines and an insulating layer 201 is located between the repair and address lines. Insulating layer 201 dielectrically separates the repair line 13A from the main line 13B. When it is desired to short the repair line to the main line laser pulses are directed at the location 203 (schematically depicted as a circle) on repair line 13A'. A laser pulse(s) at this location is suitable to achieve electrical shorting of the auxiliary the repair line to the main line by rupturing the insulation. By way of example, repair line 13A' may be fabricated of molybdenum and main address line of 13B of titanium. Insulating layer 201 comprises a layer of approximately 1500 angstroms of silicon nitride overlaid by a 2500 angstrom layer of amorphous silicon. A 1 microsecond laser pulse from a pulsed xenon laser with an energy level of 0.1 milijoules per pulse when applied to location 203 is suitable to break through the insulation layers and fuse the molybdenum to the titanium. Alternatively, as shown in FIG. 3B an epoxy or paint layer 204 filled with conducting particles such as silver may be utilized as the insulating layer. An application of laser pulse causes the metallic particles in the epoxy or paint to fuse to form a conducting layer between the auxiliary repair line and the main address line to short the two together.

To sever auxiliary repair line 51, a laser pulse is applied either at point 53 or point 54, i.e., at a point beyond the intersection 52 where the repair line has been shorted to the main address lines. The laser pulse vaporizes the metallic auxiliary repair lines 51 thereby severing the repair line. Thus, a second repair line is formed from the remaining portion of repair line 51 and its associated driver pad 19 to form a second repair line which may be used to repair any main address line beyond the point where line 51 has been severed.

An alternative technique of electrically shorting together auxiliary and main address lines 12A' and 12B' is depicted in FIG. 3B, which is similar to FIG. 3A. An electrical shorting (i.e., conducting) medium 204 such as conductive epoxy, is applied to auxiliary and main address lines 12A' and 12B', respectively, over insulating layer 302, so as to electrically short the lines together. By way of example, a suitable conductive paste for forming electrical shorting medium 204 is epoxy or paint filled with silver particles.

It will be apparent that a Liquid Crystal Display arrangement has been described which permits ready repair of open circuited address lines through the incorporation auxiliary repair lines for the Display, address lines. More importantly, each auxiliary repair line may be driven from both ends and readily separated into two repair lines. This permits halving of the total number of repair while maintaining the same repair capacity.

While the invention has been described with respect to preferred embodiments thereof, the invention is by no means limited thereto since many modifications of the instrumentalities employed and the structures may be made and still fall within the scope of the invention. It is intended by the appended claims to cover all such modifications as fall within the true spirit and scope of the invention.

I claim:

1. An information display device comprising:
   (a) a plurality of optical display elements arranged in an X-Y matrix format;
   (b) a plurality of main X address lines of electrically conductive material;
   (c) a plurality of main Y address lines of electrically conductive material, said X and Y address lines being transversely oriented to each other;
   (d) each of said optical display elements being connected to a single main X address line and to a single main Y address line through an individual switching device whereby each of said elements has a unique X-Y address in the said matrix; and main X and Y address lines being adapted to supply energizing and switching signals to said optical display elements to provide an optical output;
   (e) a plurality of auxiliary address lines of electrically conducting material crossing over each of said main X and main Y address lines at a plurality of crossover points said auxiliary address lines being electrically insulated from the crossover points each of said auxiliary address lines adapted to be connected to one of said main address lines at a crossover point to repair any open circuited main address line to allow said repaired main address line to be driven from said auxiliary line, the number of auxiliary lines associated with said main X and Y address lines being less in number than the main address lines;
   (f) each of said auxiliary lines having signal input pads at each end so that said auxiliary line may be driven from both ends; whereby severance of an auxiliary line beyond the crossover point at which said auxiliary line is connected to a main line converts an auxiliary line into two repair line portions, said portion beyond the initial point of repair being adapted to be connected to any one of the main address lines beyond said initial point of repair for further repair.

2. The information display device according to claim 1 wherein a plurality of auxiliary address lines cross a plurality of main X and Y address lines.

3. The information display device according to claim 2 wherein said main X address lines are interdigitated and said main Y address lines are interdigitated.

4. The information display device according to claim 3 wherein each of said optical display elements comprises a liquid crystal display element.

5. The information display device according to claim 4 wherein each of said liquid crystal display elements is coupled to one of said main X and Y address lines through a transistor switching device.

6. The information display device according to claim 5 wherein said switching device is a field effect transistor.

7. The information display according to claim 1 wherein said auxiliary address line crosses said main X and Y address lines outside of the X-Y matrix of optical display elements.

* * * * *